(12) United States Patent
Pain

(10) Patent No.: US 10,465,405 B2
(45) Date of Patent: Nov. 5, 2019

(54) SKIMMER BOX ASSEMBLY

(71) Applicant: North Star Technology International Limited, Marsa (MT)

(72) Inventor: Kerry R. Pain, Queensland (AU)

(73) Assignee: North Star Technology International Limited, Marsa (MT)

( * ) Notice: Subject to any disclaimer, the term of this patent is extended or adjusted under 35 U.S.C. 154(b) by 79 days.

(21) Appl. No.: 15/805,655

(22) Filed: Nov. 7, 2017

(65) Prior Publication Data
US 2018/0245363 A1    Aug. 30, 2018

(30) Foreign Application Priority Data

Feb. 24, 2017   (AU) ................................ 2017900626
Feb. 27, 2017   (AU) ................................ 2017900647
Apr. 18, 2017   (AU) ................................ 2017901408

(51) Int. Cl.
| | |
|---|---|
| *E04H 4/12* | (2006.01) |
| *C02F 1/40* | (2006.01) |
| *E04H 4/00* | (2006.01) |
| *C02F 1/00* | (2006.01) |
| *C02F 103/42* | (2006.01) |

(52) U.S. Cl.
CPC ............ *E04H 4/1272* (2013.01); *C02F 1/40* (2013.01); *C02F 1/001* (2013.01); *C02F 2103/42* (2013.01); *E04H 4/0037* (2013.01)

(58) Field of Classification Search
CPC ....... E04H 4/1272; E04H 4/0037; C02F 1/40; C02F 1/001; C02F 2103/42

USPC .......................................... 210/167.1, 167.18
See application file for complete search history.

(56) References Cited

U.S. PATENT DOCUMENTS

| | | |
|---|---|---|
| 3,792,499 A | 2/1974 | Whitaker |
| 4,348,281 A | 9/1982 | Perry et al. |
| 4,737,279 A | 4/1988 | Lewis |
| 4,997,558 A | 3/1991 | Baker |
| 2006/0042689 A1 | 3/2006 | Hinojosa |
| 2017/0121994 A1* | 5/2017 | Keeler ................. E04H 4/1272 |

(Continued)

OTHER PUBLICATIONS

Australian Government International—Type Search for Provisional Patent Application; dated Mar. 9, 2017 for App. No. 2017900647.

(Continued)

*Primary Examiner* — Fred Prince
(74) *Attorney, Agent, or Firm* — Luedeka Neely Group, P.C.

(57) ABSTRACT

A skimmer box assembly for a swimming pool includes a first weir adjacent a main body of the swimming pool, and a second weir is positioned downstream of the first weir. An entry well is provided between the first weir and the second weir to allow passage of water from the main body of the swimming pool, and a collection box is provided downstream of the second weir and in fluid communication with the first and second weirs. An outlet from the collection box allows outflows of water, and a weir door may be positioned in the second weir with the weir door hinged to permit rotation with an arc of 90° or thereabouts. The weir door is preferably located opposite the entry well and preferably includes a float to facilitate movement of the weir door in correspondence with the water level inside the skimmer box assembly.

14 Claims, 4 Drawing Sheets

(56) References Cited

U.S. PATENT DOCUMENTS

2017/0175410 A1* 6/2017 Smith .................. E04H 4/1272

OTHER PUBLICATIONS

Australian Government International Search Report dated Apr. 12, 2018.
Australian Government International Written Opinion dated Apr. 12, 2018.

* cited by examiner

SKIMMER BOX ASSEMBLY

FIELD OF THE INVENTION

The present invention relates to skimmer box assemblies for use in swimming pools. The assembly may also be suitable for other contained bodies of water such as spas, and particularly for recreational use, bathing and swimming.

BACKGROUND

Conventional swimming pools usually have a skimmer box arrangement comprising an inlet to allow movement of water from the main body of water into the skimmer box. The skimmer box defines an inlet to a filtration system that is powered by an in-line filter pump. The filtration system draws water predominantly from the bottom of the skimmer box and through a filter cage which provides initial filtration of water. It is common to have a rotatable weir door across the inlet and of a density to move with the flow of water, which door rotates downwards and allows water to flow into the system upstream of the filter pump. When the filtration system is not pressurised the weir door sits largely vertically or at least to the top of the water level.

One of the problems with this arrangement is that the presence of the weir door means the entry must have a significant depth from top to bottom. The typical entry would be seen as a square or rectangular box having top and bottom sides. This necessitates a level of water in the pool which is significantly below the top edge of the pool, creating a smaller holding capacity for water in a given volume of a swimming pool.

However, in some circumstances and according to some pool designs it is desirable to maintain a level of water in a pool very near to the top edge of the pool. Therefore there is a need for an improved skimmer box assembly.

OBJECT OF THE INVENTION

It an object of the present invention to overcome, and/or alleviate one or more of the disadvantages of the prior art or provide the consumer with a useful or commercial choice.

SUMMARY OF THE INVENTION

In the first aspect although it need not be the only or the broadest aspect the invention resides in a skimmer box assembly for a swimming pool or similar, the skimmer box assembly comprising:
 a first weir adjacent a main body of the swimming pool;
 a second weir positioned downstream of the first weir;
 an entry well between the first weir and the second weir to allow passage of water from the main body of the swimming pool;
 a collection box downstream of the second weir and in fluid communication with the first and second weirs; and
 an outlet from the collection box to allow outflow of water.

The skimmer box assembly preferably includes a weir door positioned in the second weir, the weir door hinged to permit rotation with an arc of 90° or thereabouts. The weir door is preferably located opposite the entry well.

The weir door preferably includes a float to facilitate movement of the weir door in correspondence with the water level inside the skimmer box assembly.

The first weir and the second weir are preferably formed as rectangular boxes although any suitable shape may be used.

Preferably, the first weir is a fixed wall.

An entry to the first weir is preferably an elongated slot. The slot may be open at the top. Preferably the slot is located in an upper section of the first weir. The collection box is preferably a skimmer box adapted to receive a filter cage.

The outlet is preferably located at the bottom of the collection box.

Preferably, the entry well has a bottom that surrounded by the first weir, the second weir and two side walls.

Preferably, low water delivery pipes are in fluid communication between the main body of the swimming pool and the collection box.

Preferably, when the weir door is rotated to a vertical position an upper most portion of the weir door remains below a designated water level of the main body of the swimming pool.

BRIEF DESCRIPTION OF THE DRAWINGS

To assist in understanding the invention and to enable a person skilled in the art to put the invention into practical effect, preferred embodiments of the invention are described below by way of example only with reference to the accompanying drawings, in which.

DETAILED DESCRIPTION OF THE PREFERRED EMBODIMENT

Figure 1:
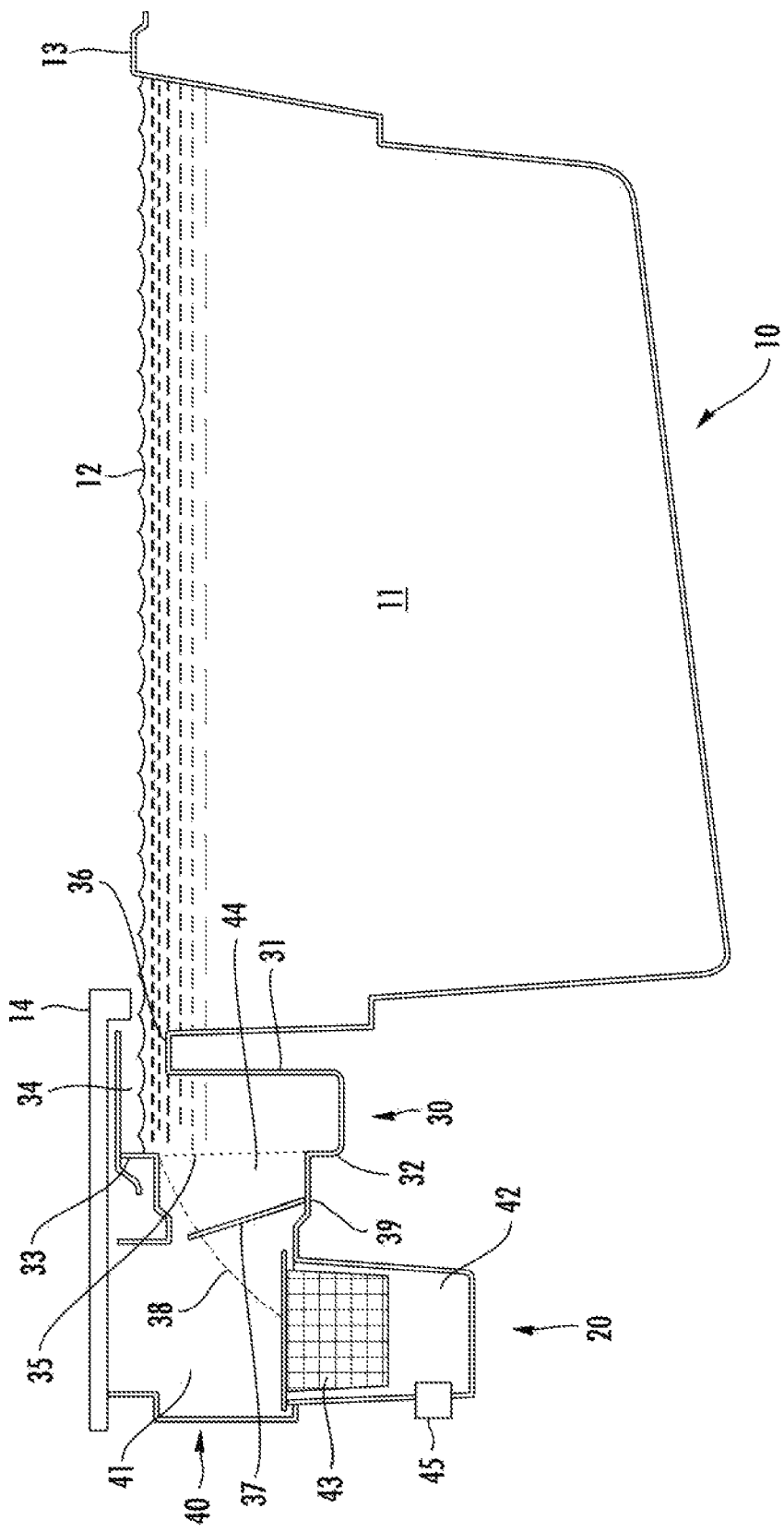
FIG. 1 is a cross-sectional side view of a swimming pool with a skimmer box assembly, according to some embodiments of the present invention.

The present invention relates to skimmer box assemblies. Elements of the invention are illustrated in concise outline form in the drawings, showing only those specific details that are necessary to understanding the embodiments of the present invention, but so as not to clutter the disclosure with excessive detail that will be obvious to those of ordinary skill in the art in light of the present description.

In this patent specification, adjectives such as first and second, left and right, upstream and downstream, above and below, top and bottom, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present invention.

According to one aspect, the present invention is defined as a skimmer box assembly for a swimming pool or similar, the skimmer box assembly comprising: a first weir adjacent a main body of the swimming pool; a second weir positioned downstream of the first weir; an entry well between the first weir and the second weir to allow passage of water from the main body of the swimming pool; a collection box downstream of the second weir and in fluid communication with the first and second weirs; and an outlet from the collection box to allow outflow of water.

Advantages of some embodiments of the present invention include the ability to position the second weir substantially below a designated water level of the main body of the swimming pool. That in turn enables the swimming pool to be filled closer to its top edge while maintaining a low profile of coping material covering the first and second weirs.

FIG. 1 is a cross-sectional side view of a swimming pool 10 having a main body of water 11, a designated water level 12 and an edge 13. A skimmer box assembly 20 is positioned at one end of the swimming pool 10. The skimmer box assembly 20 has an entry well 30 and collection box 40. The entry well 30 is formed as a rectangular box having a front wall 31 and bottom 32. A rear wall 33 is above an exit 35. The entry well 30 has a top 34 which may be removable. A first weir 36 separates the entry well 30 from, and is adjacent to, the main body of water 11. The first weir 36 is formed as a slot-like arrangement at the top of the entry well 30.

A second weir 44 is positioned downstream of the first weir 36. A weir door 37 is positioned in the second weir 44 and pivots at the bottom end 39 to allow rotation through an arc 38, which may be any suitable arc, and that is preferably around 60° to 90°. The weir door 37 may have a float in its upper edge to allow movement of the door 37 in response to water flowing from the entry well 30 through the second weir 44.

The second weir 44 provides fluid communication into an upper collection chamber 41 that sits above a lower collection chamber 42, which is adapted to receive a filter cage 43. An outlet 45 near a bottom of the lower collection chamber 42 facilitates connection to a recirculating and filtering system (not shown), including a filter pump, as is well known in the art of pool designs.

In operation, as shown in FIG. 1, water flows downstream through the skimmer box assembly from right to left from the main body of water 11, through the first weir 36, through the entry well 30, through the second weir 44, and finally through the upper and lower collection chambers 41, 42 to the outlet 45.

The present arrangement enables a designated water level 12 of the pool 10 to be maintained close to an upper edge of a coping 14 around the pool 10, while enabling the first weir 36 to skim water from near the surface of the main body of water 11. As the first weir 36 does not require the use of a weir door, an entry of the first weir 36 can define a low-profile slot. The weir door 37 then can be positioned further below the designated water level 12. For example, as shown, according to some embodiments when the weir door 37 is rotated to a vertical position an upper most portion of the weir door 37 remains below the designated water level 12 of the main body of water 11.

The present arrangement thus allows for the pool 10 to carry a greater proportion of its volume as water when compared to pools of the prior art, while the upper edge of the coping 14 maintains a desirable low profile.

Figure 2:
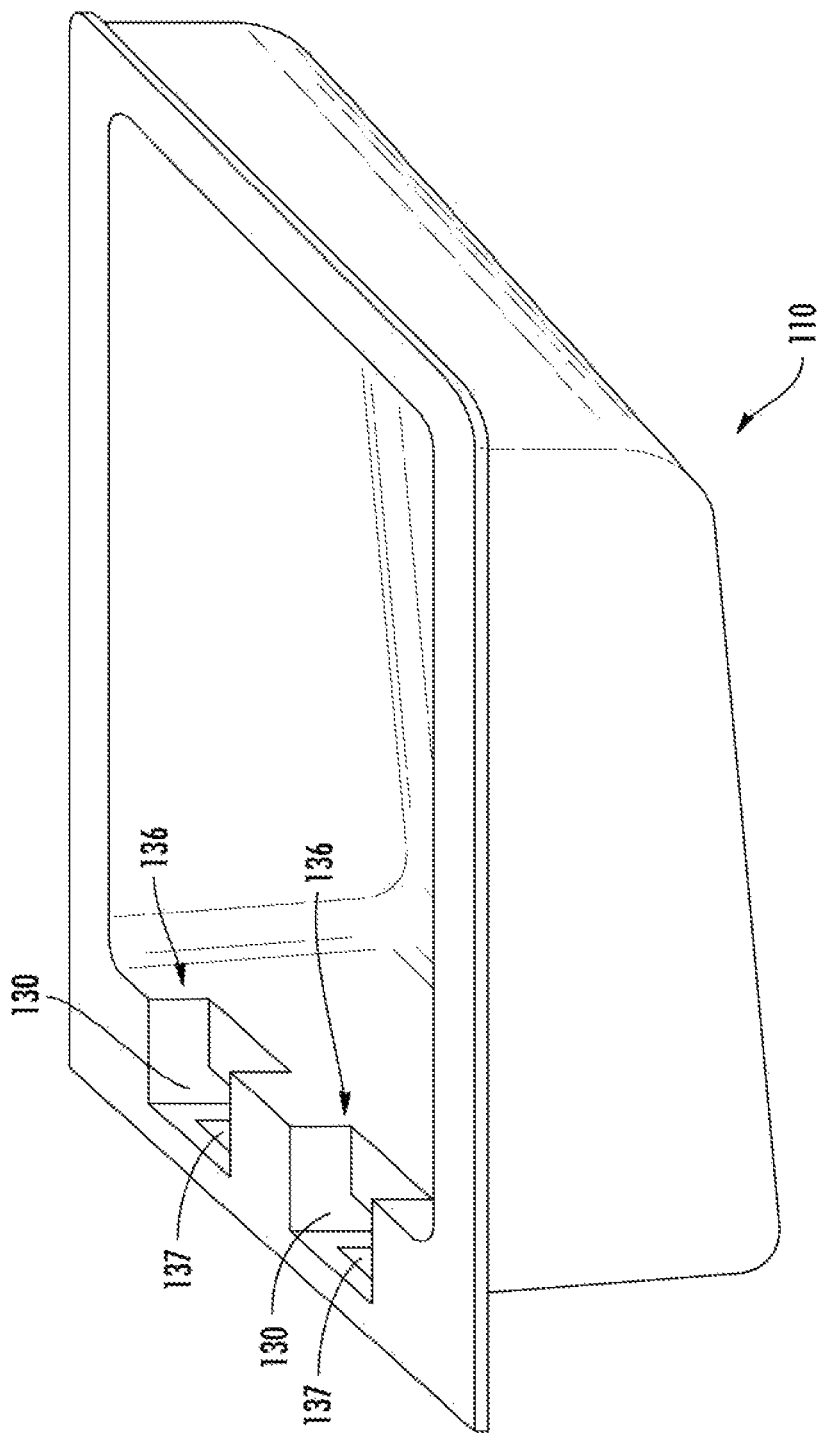
FIG. 2 is a perspective view of another version of a pool, similar to the pool of FIG. 1 but showing a pair of first weirs, according to some embodiments of the present invention.

FIG. 2 shows a perspective view of another version of a pool 110, similar to the pool 10 but showing a pair of first weirs 136. The top of the entry to the first weirs 136 may be covered by coping stones (not shown) or similar when in operation. Weir doors 137 are apparent behind a pair of entry wells 130.

Figure 3:
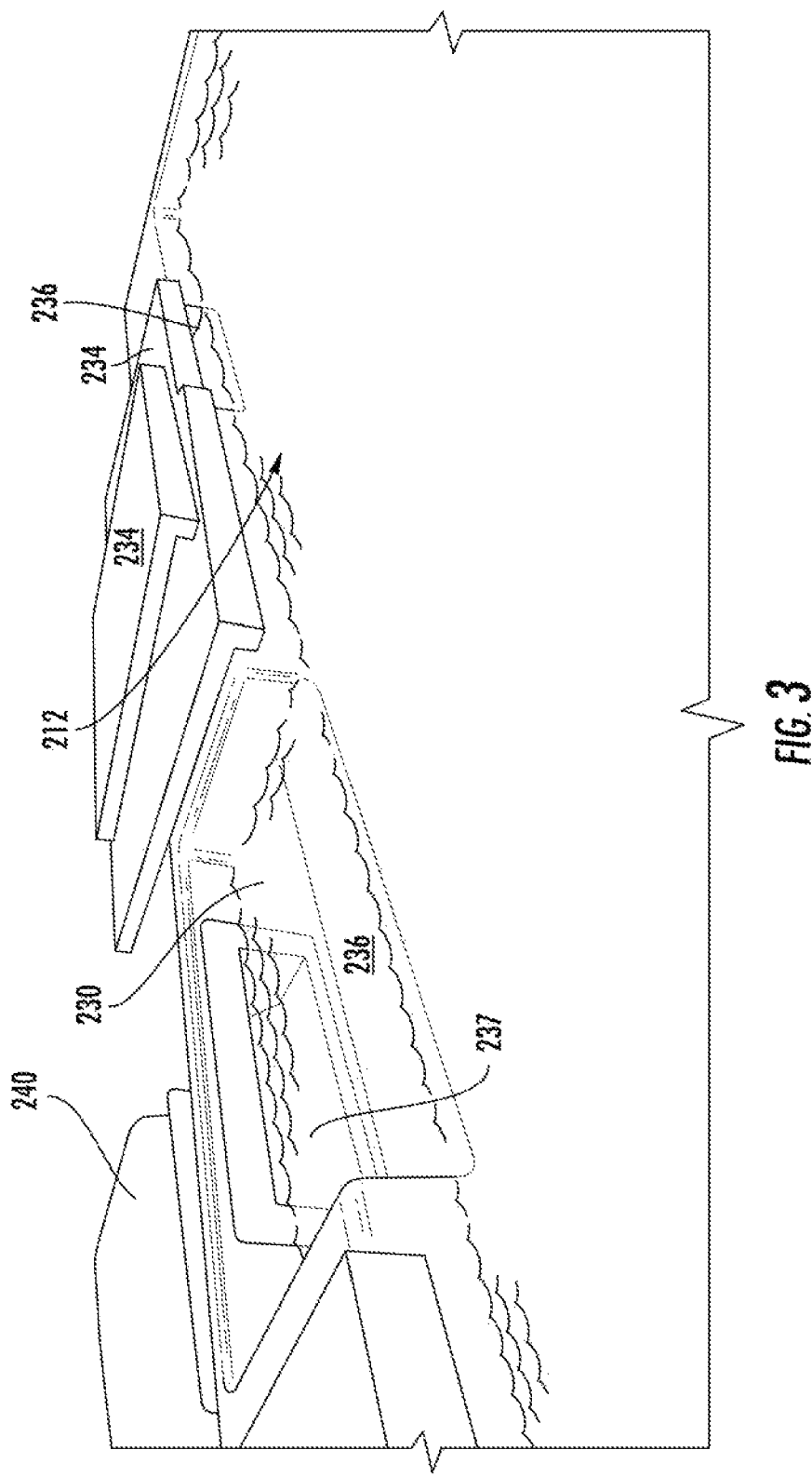
FIG. 3 is a close up perspective view of a pair of first weirs, which is similar to the pair of first weirs shown in FIG. 2, according to some embodiments of the present invention.

FIG. 3 is a close up perspective view of a pair of first weirs 236, which is similar to the pair of first weirs 136. A water level 212 is shown flowing over the first weirs 236, with an entry well 230 and a weir door 237 apparent. A collection box 240 sits behind and in fluid communication with the entry well 230. The top 234 of the respective weirs 236 is formed by coping stones of the conventional moulded style.

Figure 4:
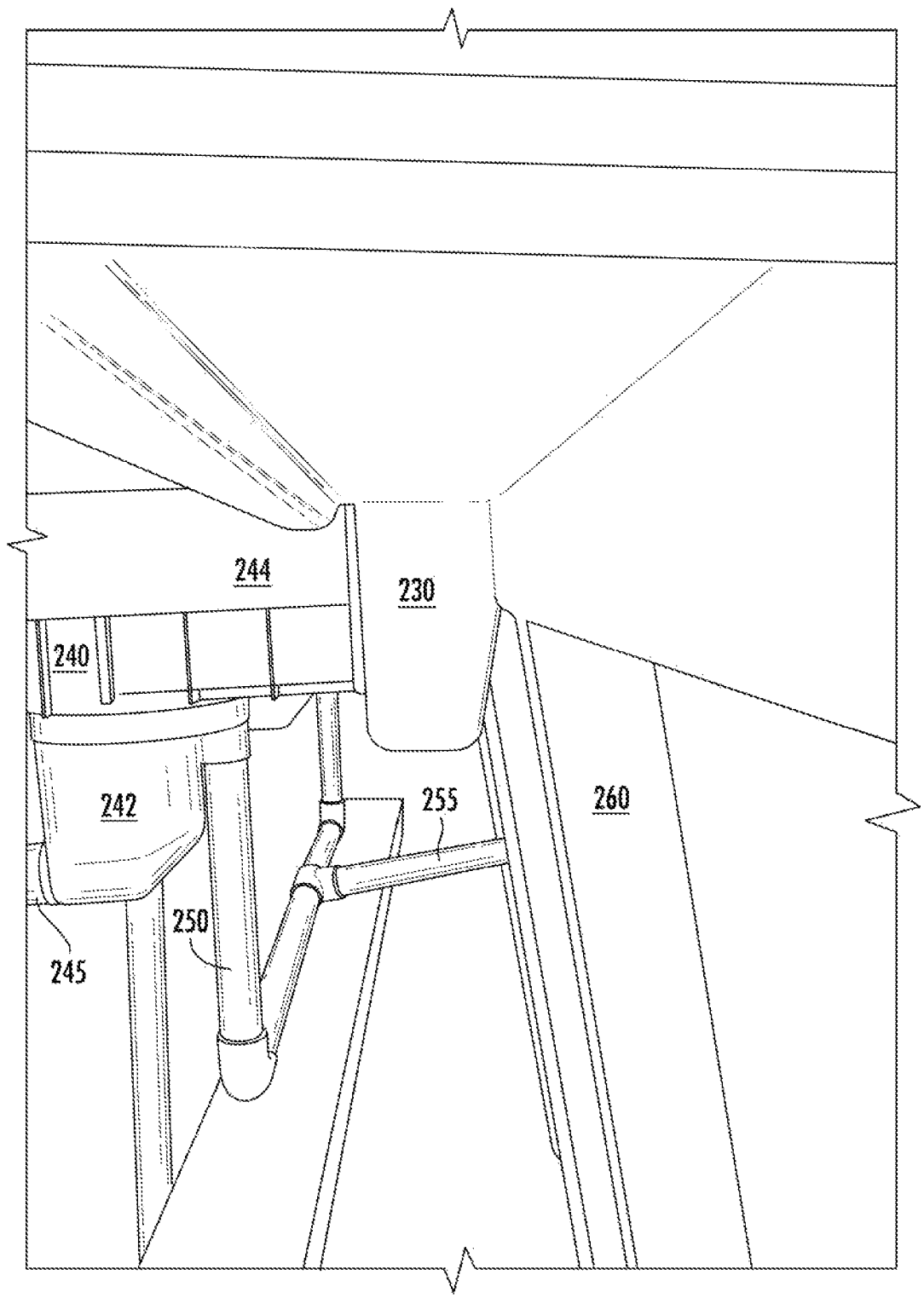
FIG. 4 is a side view of an outside of a skimmer box assembly, according to some embodiments of the present invention.

FIG. 4 is a side view of an outside of a skimmer box assembly according to an embodiment of the present invention. A second weir 244 receives water from an entry well 230 and then channels water flow into an upper collection chamber 240, then to a lower collection chamber 242 and to an outlet 245.

Plumbing shown in FIG. 4 shows the upper collection chambers 240 of a pair of skimmer box assemblies being connected into U-shaped low-water delivery pipes 250 that connect to a single safety suction point 255 in the pool 260.

Those skilled in the art will generally appreciate that production versions of the present invention will have one safety suction line plumbed in per skimmer box. As best illustrated by FIGS. 1 and 3, given that the first weirs 36, 236 are fixed walls there is a possibility that the water level 12, 212 may fall below the first weirs 36, 236. However, the skimmer box assemblies can still operate effectively at such lower water levels, as water still can be drawn from the safety suction point 255, which will allow the filter pump to maintain prime.

Those skilled in the art will appreciate that various components of embodiments of the present invention can be made of various materials, or a combination of various materials, including PVC, fibreglass, stone, metal alloys, plastics, or composites.

The above description of various embodiments of the present invention is provided for purposes of description to one of ordinary skill in the related art. It is not intended to be exhaustive or to limit the invention to a single disclosed embodiment. Numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present invention that have been discussed herein, and other embodiments that fall within the spirit and scope of the above described invention.

The invention claimed is:

1. A skimmer box assembly, comprising:
    a first fixed wall defining a first weir adjacent a main body of water;
    a second weir positioned downstream of the first weir;
    an entry well between the first weir and the second weir, wherein the entry well has a bottom that is surrounded by the first weir, the second weir, and two side walls;
    a collection box downstream of the second weir and in fluid communication with the first and second weirs; and
    an outlet from the collection box to allow outflow of water.

2. The skimmer box assembly of claim 1, further comprising a weir door positioned in the second weir.

3. The skimmer box assembly of claim 2, wherein the weir door is hinged to permit rotation within an arc of approximately 90°.

4. The skimmer box assembly of claim 2, wherein the weir door includes a float to facilitate movement of the weir door in correspondence with a water level inside the skimmer box assembly.

5. The skimmer box assembly of claim 2, wherein the first weir and the second weir define rectangular boxes.

6. The skimmer box assembly of claim 2, wherein when the weft door is rotated to a vertical position an upper most portion of the weft door remains below a designated water level of the main body of water.

7. The skimmer box assembly of claim 2, wherein an entry to the first weir is an elongated slot.

8. The skimmer box assembly of claim 7, wherein the slot is open at the top.

9. The skimmer box assembly of claim 7, wherein the slot is located in an upper section of the first weir.

10. The skimmer box assembly of claim 1, wherein the outlet is located adjacent a bottom of the collection box.

11. The skimmer box assembly of claim 1, wherein low water delivery pipes are in fluid communication between the main body of water and the collection box.

12. The skimmer box assembly of claim 1, wherein the main body of water is a swimming pool.

13. The skimmer box assembly of claim 1, wherein the entry well further includes a rear wall.

14. The skimmer box assembly of claim 13, wherein the entry well further includes an exit to the second weft, the rear wall being disposed at least partially above the exit.

* * * * *